March 18, 1969  R. O. WILSON ET AL  3,434,046
ELECTRONIC BOREHOLE CASING COLLAR LOCATOR
Filed Dec. 20, 1965

INVENTORS.
ROBERT O. WILSON
PAUL LORENZINO, JR.

BY Burns, Doane, Benedict,
Swecker & Mathis
ATTORNEY

INVENTORS.
ROBERT O. WILSON
PAUL LORENZINO, JR.

3,434,046
ELECTRONIC BOREHOLE CASING
COLLAR LOCATOR
Robert O. Wilson and Paul Lorenzino, Jr., Duncan, Okla.,
assignors to Halliburton Company, Duncan, Okla., a
corporation of Delaware
Filed Dec. 20, 1965, Ser. No. 514,829
U.S. Cl. 324—34                                    5 Claims
Int. Cl. G01r 33/12; G01v 3/08

ABSTRACT OF THE DISCLOSURE

A magnetic borehole casing joint detector having a generally E shaped core positioned against the wall of the casing by an expandable bow spring and having a time phase modulated pulse signal output which may be interposed between other logging signals on a single conductor. The center leg of the core is wound with an alternating current excited winding. Discontinuities in the casing are detected by modifications in the magnetic flux which couples detection coils mounted on the outside legs of the core in phase opposition.

---

This invention relates to apparatus for detecting joints between adjoining sections of borehole casings. More particularly, this invention relates to magnetic apparatus for detecting such joints by the utilization of magnetic principles.

It is often necessary in acoustic or gamma ray borehole logging to be able to accurately determine the location of joints in the casing used to line the borehole. These joints may take a variety of forms, but conventionally comprise casing collars threadedly connecting two casing sections. The collar adds to the thickness of the casing and an air gap is usually left inside the collar between the ends of the casing sections and the collar. Other types of casing joints may include only male and female casing sections threadedly joined in a flush end-to-end relationship.

Casing joint detectors of the magnetic type have been heretofore developed to indicate the location of both of the above-mentioned types of casing joints. For instance, permanent magnets have been utilized to provide opposing paths of magnetic flux which vary as the magnets pass the casing joints. However, devices of this type sometimes give rise to spurious indications due to excessive leakage fluxes. Additionally, the permanent magnets used by these devices tend to age rapidly when subjected to the large demagnitizing forces and extreme temperature ranges encountered in normal borehole casing environments, thus requiring expensive replacement. Further, casing joint locators utilizing permanent magnets sometimes have an excessively large size and often have to be exactly centered within the borehole casing for accurate detection of joints.

Many of the previously developed magnetic casing joint detectors have required continuous movement through the casing for proper operation. Although magnetic detectors have been devised which can detect casing joints at zero logging speed, these detectors have often required moving parts which are subject to mechanical failure. These prior detectors also usually must be exactly centered in the borehole for accurate operation, and hence their accuracy often varies in boreholes having varying diameters.

Moreover, the magnetic joint detection devices heretofore developed usually provide constantly varying signals which require a separate conductor to carry the signals from the borehole to the surface for recording. This is often unsatisfactory, for in combination logging tools, such as those using casing collar detectors in addition to acoustic or gamma ray loggers, it is desirable to reduce the number of signal-carrying conductors to reduce crosstalk and other signal interference.

It is therefore a general object of the present invention to substantially eliminate or minimize the disadvantages found in casing joint detectors heretofore developed.

It is more particularly an object of this invention to provide a magnetic casing joint detector which is not dependent upon permanent magnets.

It is another object of the present invention to provide a magnetic casing joint detector for accurately locating casing joints irrespective of the diameter of the casing.

It is yet another object of the instant invention to provide a magnetic casing joint detector which may accurately operate at very slow or zero logging speed.

It is a further object to provide a magnetic casing joint detector having a time phase modulated pulse signal output which may be interposed between other logging signals on one conductor.

In accordance with the invention, the casing joint detector, or locator, comprises a generally E-shaped core mounted upon an expandable bow spring to be firmly held against the sides of a borehole casing. A first extending leg portion of the core carries an alternating current excited winding and emits alternating magnetic flux which passes through the casing, and second and third leg portions of the core receive the alternating magnetic flux. The second and third leg portions carry windings connected in phase opposition so that an output is provided upon the occurrence of a casing joint in one of the alternating magnetic flux paths.

The invention and its many advantages may be further understood by reference to the following detailed description illustrated in the accompanying drawings in which.

Figure 1:
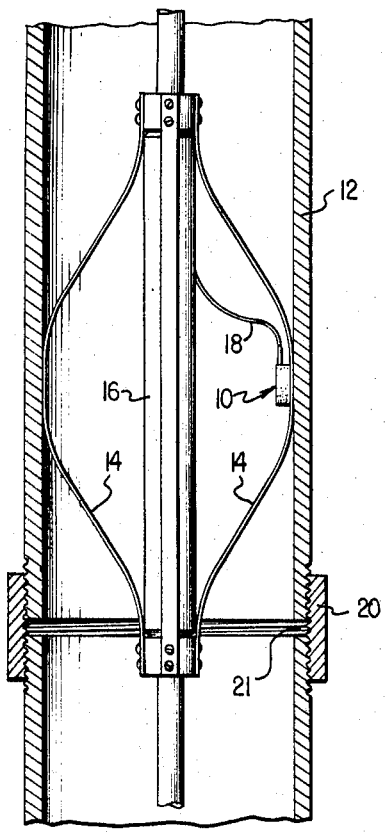
FIGURE 1 is a view of the casing joint detector assembly of the present invention.

Referring now to FIGURE 1, the casing joint detector assembly of the instant invention is illustrated wherein a casing joint detector 10 is mounted upon the expendable bow spring 14 and held firmly against the wall of a borehole casing 12 by the force exerted by the bow spring 14. Mandrel 16 supports the bow springs 14 and is transported through the borehole casing by means of a conventional cable and winch means (not shown). The mandrel 16 may also carry conventional acoustic and gamma ray logging apparatus, or other instruments such as a gun perforator (not shown). Signals from the casing joint locator 10 are fed to the surface through an insulated cable 18, where the signals may be indicated or recorded by suitable devices. As will be subsequently described, the signals from the detector 10 may be interposed between other logging signals, such as an acoustic logger, on a single conductor. A casing collar joint 20 is also illustrated, including an air gap 21 which is detected by the instant detector 10 to indicate the presence and location of the casing collar, as will be later described.

Figure 2:
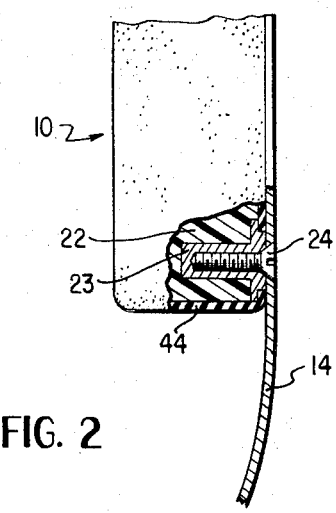
FIGURE 2 is a partial cross-sectional view of the casing joint detector assembly of the instant invention.

FIGURE 2 shows the casing collar detector 10 in more detail, and particularly illustrates the connection between the detector 10 and the expandable bow spring 14, which is made from a nonmagnetic material, such as beryllium copper. As shown by the cutaway portion, the internal parts of the detector 10 are encapsulated by a plastic resin casting 22. Disposed in the casting on two ends of the detector 10 are inserts 23 which have threaded counterbores for receiving screws 24. Holes are provided in the spring 14 to allow the screws 24 to be secured into the inserts 23 to fixedly mount the detector 10 to the expandable spring 14. This method of mounting allows the detector 10 to be easily removed for replacement or repair, and yet also provides a secure fastening for the detector while keeping the electrically sensitive components of the detector electrically insulated. Spring 14 affords protection to detector 10 as the casing is traversed during logging, as well as maintaining it in the desired proximity thereto.

Figure 3:
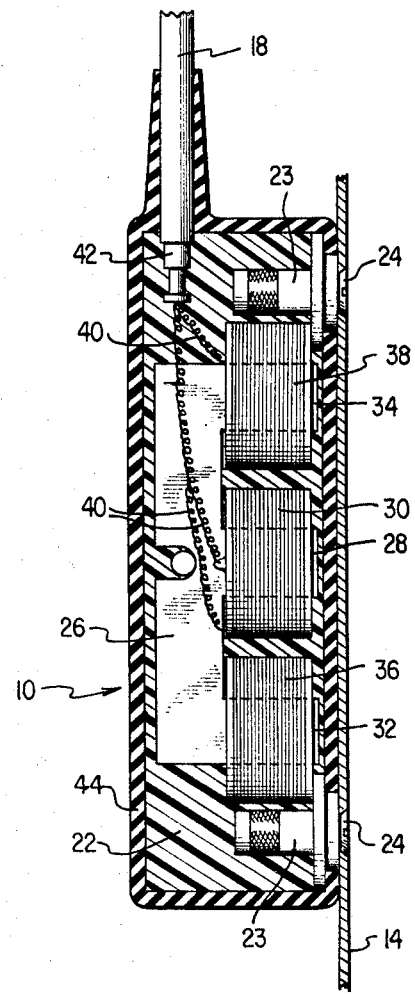
FIGURE 3 is a cross-sectional view of the casing joint detector of the instant invention.

Considering FIGURE 3, a cross-sectional view of the casing joint detector 10 is shown. Inserts 23 may be seen to be disposed in their relative positions to enable secure fastening of the assembly to the expandable bow springs 14, as previously described. A generally E-shaped laminated iron core 26 is shown surrounded by the plastic resin casting 22. Core 26 includes a first outwardly extending leg portion 28 surrounded by an inductive coil 30 which is adapted to be energized by an alternating current voltage source to cause the leg portion 28 to emit magnetic flux. Core 26 further includes second and third outwardly extending leg portions 32 and 34, and their associated pick-up coils 36 and 38. The air gaps between each end leg and the central leg are equal. The entire assembly may be constructed with a length of a few inches.

The free ends of the leg portions 32 and 34 are disposed toward the wall of the borehole casing during normal use of the detector 10 in order to receive the magnetic flux emitted by the leg portion 28. Alternating current voltages proportional to the magnetic flux received by the respective leg portions are then induced in the pick-up coils 36 and 38. The pick-up coils 36 and 38 are connected together in phase opposition, to be later described in more detail, so that no output will be provided except in the presence of an unsymmetrical magnetic environment such as is encountered adjacent a casing joint. Electrical signals are fed to and from the core 26 through electrical leads 40 which are in turn connected to three terminals 42, only one of which is shown. A rubber boot 44 completely surrounds the casing joint detector 10 except for the openings of inserts 22, in order to protect the encapsulated detector from borehole fluids and unwanted electrical contact.

Figure 4A:
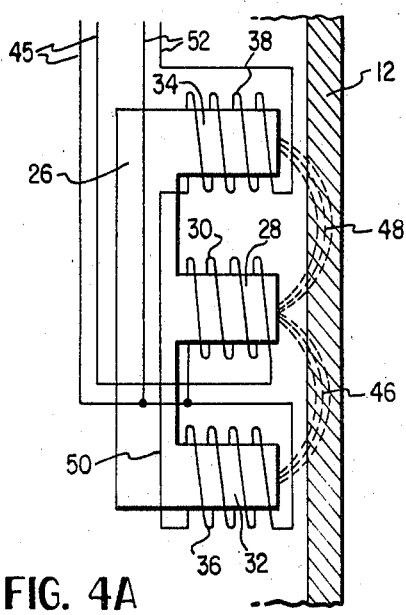
FIGURES 4a and 4b are diagramamtical views of the instant casing joint detector illustrating the operation thereof.
Figure 4B:
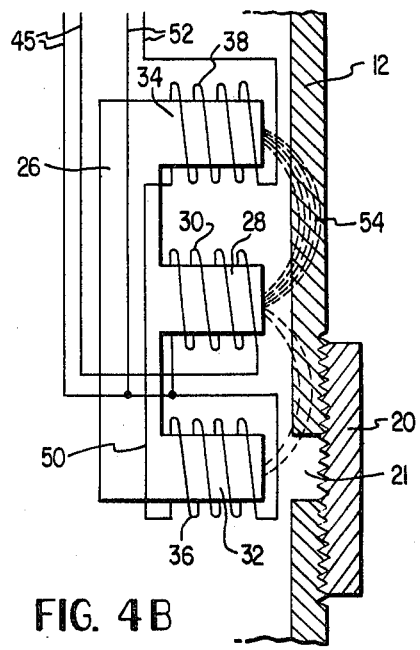

The operation of the casing joint detector 10 may be best understood by reference to FIGURES 4a and 4b. FIGURE 4a shows the generally E-shaped core 26 and its extending leg portions 28, 32 and 34. The inductive winding 30 is energized through leads 45 by an alternating current source (not shown) in order to cause extending leg portion 28 to emit magnetic flux paths 46 and 48 through the casing wall. Alternating current voltages are then induced in pick-up coils 36 and 38 in response to the magnetic flux received by the leg portions 32 and 34 from the casing wall. The pick-up coils 36 and 38 are interconnected by lead 50 in phase opposition so that the induced voltages in the pick-up coils cancel when the magnitude of the magnetic flux received by extending leg portion 32 is equal to the magnitude of the magnetic flux received by extending leg portion 34. Thus, when leg portions 32 and 34 receive equal magnitudes of alternating magnetic flux, no alternating current output is produced on the output leads 52.

FIGURE 4b illustrates how the instant invention provides an output alternating current voltage upon the occurrence in the casing wall of a casing collar 20, with its associated air gap 21. Due to the air gap 21, the magnitude of the magnetic flux path 54 will become substantially greater than the small amount of magnetic flux received by the extending leg portion 32. Hence, the voltage induced in winding 38 will be substantially greater than the induced voltage in pick-up coil 36 and therefore an alternating current voltage output will appear across the output leads 52. As the detector 10 moves downwardly in the showing of FIGURE 4b, the air gap will reduce the amount of flux received by the leg portion 34, and the resulting higher magnitude of alternating current voltage induced in winding 36 will also produce an alternating output across output leads 52.

Figure 5:
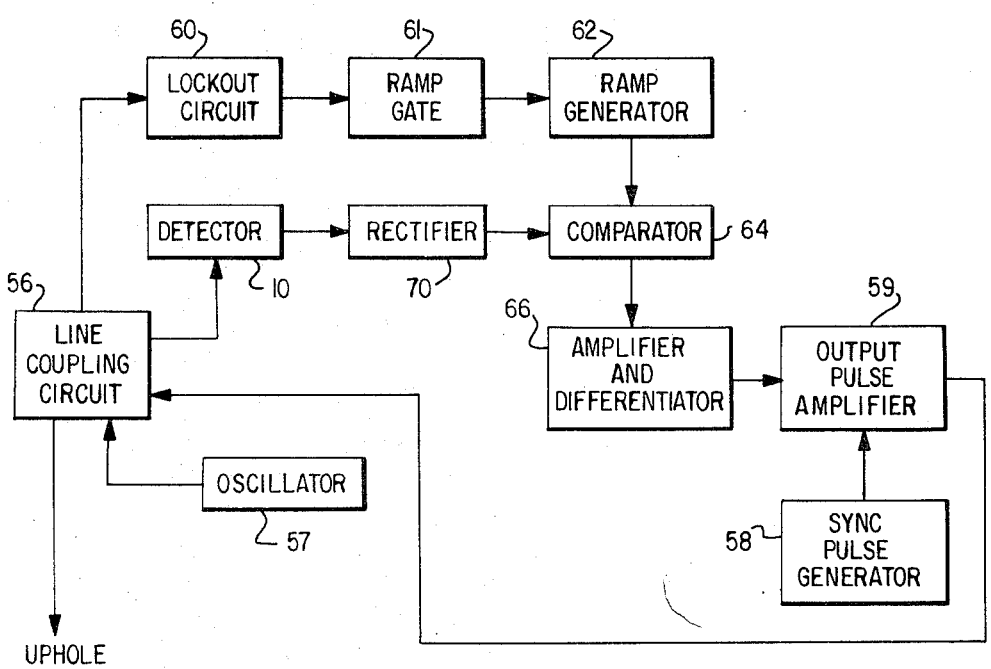
FIGURE 5 is a block diagram of the electrical circuitry associated with the casing joint detector of the instant invention.

FIGURE 5 shows the electronic circuitry utilized in conjunction with the casing joint detector 10 of the instant invention in order to allow simultaneous transmission of the casing joint signals with other logging signals, such as acoustic logging signals. The circuitry may comprise semi-conductor active elements and thus be encapsulated in a small module in a manner known in the art to provide a very reliable circuitry which may be disposed in the mandrel 16. While all of the circuits diagrammatically shown in FIGURE 5 are conventional, their particular novel arrangement with the detector 10 enables accurate determination of the location of casing joints without requiring a continuous output signal which must be sent uphole on a separate cable conductor.

A line coupling circuit 56 feeds a high frequency alternating current voltage from a suitable oscillator 57, which may be located uphole, to the casing joint detector 10 in order to cause the detector 10 to emit alternating magnetic flux, as previously described. A sync pulse generator 58 produces a series of pulses which are amplified by amplifier 59 and fed through the coupling circuit 56 to a lockout circuit 60, which is triggered into a monostable period of conduction and thus will not accept another sync pulse until the predetermined period of conduction is over. Where the detector 10 is utilized with an acoustic logger, the generator 58 may be disconnected and the sync pulses derived from the acoustic logger. The lockout circuit 60 feeds a negative square wave voltage to a conventional ramp gate circuit 61, which differentiates the square wave and provides an amplified, negative-going square wave which is utilized to drive the ramp generator 62. The ramp generator 62 provides a positive ramp voltage initially rising from zero potential and having a predetermined rate of rise which is fed to the comparator circuit 64.

When detector 10 is not providing an output indicating the presence of a casing joint, the comparator circuit 64 is biased only by an inherent fixed reference voltage, and the circuit 64 provides an output voltage only when the ramp voltage generated by the ramp generator 62 reaches a voltage magnitude equal to the fixed reference voltage. Circuit 66 amplifies and differentiates the output voltage and feeds the resulting signal to amplifier 59, where it is rectified and amplified. The resulting positive spike output voltage substantially coincides with the point in time at which the ramp voltage from generator 62 matches the fixed reference voltage, and is interlaced between the train of sync pulses from generator 58 and coupled through the line coupling circuit 56 for transmission uphole to suitable recording equipment. The interval of time between each of the reference position positive spike output voltages and the nearest interlaced sync pulse will be substantially constant when there is no output from the detector 10. It will be understood, as previously presented, that the sync pulses may be derived from an acoustic logger. Thus, information from both an acoustic logget and the casing joint detector 10 may be sent uphole on the same signal transmission cable.

Upon detection of a casing joint or collar by the detector 10, an alternating current voltage output is produced by the detector 10. This output is applied to a rectifier 70 in order to provide a direct current voltage level to the comparator 64. This voltage level is added to the fixed reference voltage normally supplied by the comparator 64, and thus the ramp voltage from the ramp generator 62 is required to rise to a higher than normal voltage level in order to produce an output from the comparator circuit 64. This output voltage from comparator 64 occurs at a later time than normally, due to the longer rise time required for the ramp voltage to rise to the higher level. Hence, the positive spike output voltage supplied from the circuits 66 and 59 will occur at a later time with respect to the interleaved sync pulses than in the absence of an indication from detector 10. The interlaced time phase modulated positive spike output voltages and sync pulses are transmitted uphole through the line coupling circuit 56, where an indication that the detector 10 is passing through a casing joint or collar may be obtained by observing the change in time positions of the positive spike output voltage and the sync pulses. The pulse phase modulation may be observed on a cathode ray oscilloscope whose sweep is synchronized with the system synchronizing pulses, and such a display may be recorded photographically on sensitized material in depth correlation with other logging data. Obviously, a pulse modulation discriminator circuit may be employed to operate an indicator when the detector is in operational proximity to a casing joint.

It will thus be understood that the present invention provides a very accurate, as well as stable and reliable, detection circuit for providing indications of the location of casing joints. Additionally, the novel construction of the casing joint detector insures a long life and reliability of the detector. The electrical circuitry of the present invention allows indications of casing joints to be sent uphole on the same cable with other logging signals.

While a preferred embodiment of the present invention has been described, the invention is not limited to the preferred apparatus illustrated, as various modifications of the apparatus which do not depart from the essence of the present invention will be obvious to those skilled in the art.

What is claimed is:

1. Apparatus for detecting joints in a borehole casing comprising:
   mandrel means adapted to be moved through a borehole casing, said means including expandable spring means for substantially centering said mandrel means in the casings by contact with the walls thereof;
   detector means mounted on said spring means adjacent the walls of the casing for generating an output signal only when in proximity to a discontinuity in the casing, said detector means comprising a generally E-shaped core having a coil associated with each leg thereof, one of said coils being energized by an alternating current source to cause the associated leg to emit alternating magnetic flux, the other of said coils receiving said flux through the casing and being connected together in phase opposition to provide an output signal when said flux is received in unequal magnitudes. and rectifier means responsive to said output signal for providing said detector output signal;
   ramp generator means for generating a ramp voltage;
   comparator means connected to receive said output signal and said ramp voltage for generating time-phase modulated output pulses in dependency upon the proximity of said detector means to discontinuity in the casing;
   means for generating sync pulses, said ramp generator means being responsive to said sync pulses, said comparator means having a fixed reference voltage level for comparison with said ramp voltage to provide a time-phased reference series of output pulses in the absence of said detector output signal;
   lock-out means for providing only one of said sync pulses to said ramp generator means during a predetermined time interval, said lock-out means preventing false triggering of said generator means during said predetermined time interval;
   means for interlacing said sync pulses and said output pulses from said comparator means;
   means for transmitting said sync pulses and said output pulses uphole through the borehole casing; and
   recording means for recording the indications of casing joints in the borehole casing provided by the relative time phases of said sync pulses and said output pulses.

2. The apparatus of claim 1 wherein said generally E-shaped core is encapsulated in plastic casting means and including:
   rubber boot means surrounding said plastic casting means in order to provide a fluid tight and electrically insulated covering for said detector means,
   insert means disposed in said plastic casting means and extending through said rubber boot means, and
   screw means passing through said spring means and received in said insert means for securing said detector means to said spring means.

3. The apparatus of claim 1 wherein said generally E-shaped core is encapsulated in plastic coating means; and wherein said detector means has a fluid tight and electrically insulating covering.

4. The apparatus of claim 1 wherein said sync pulse generating means includes logger means.

5. The apparatus of claim 2 wherein said sync pulse generating means includes logger means.

References Cited

UNITED STATES PATENTS

| | | | |
|---|---|---|---|
| 2,459,499 | 1/1949 | Castel | 324—34.1 |
| 2,719,948 | 10/1955 | Zimmerman | 324—34.1 |
| 2,768,701 | 10/1956 | Summers | 340—18 |
| 2,870,541 | 1/1959 | Mayes | 324—34.1 |
| 3,216,524 | 11/1965 | Summers | 340—18 |
| 2,857,526 | 10/1958 | Galton | 340—206 |

FOREIGN PATENTS 599,601   3/1948   Great Britain.

RUDOLPH V. ROLINEC, *Primary Examiner.*

R. J. CORCORAN, *Assistant Examiner.*

U.S. Cl. X.R.

324—1; 340—18